(12) United States Patent
Yamada et al.

(10) Patent No.: US 9,448,703 B2
(45) Date of Patent: Sep. 20, 2016

(54) INFORMATION PROCESSING DEVICE, METHOD, AND STORAGE MEDIUM FOR EXCLUDING A REGION SELECTION IN A FORM

(71) Applicant: FUJI XEROX CO., LTD., Tokyo (JP)

(72) Inventors: Takuya Yamada, Kanagawa (JP); Yuji Yoneda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 66 days.

(21) Appl. No.: 14/607,550

(22) Filed: Jan. 28, 2015

(65) Prior Publication Data
US 2016/0026368 A1 Jan. 28, 2016

(30) Foreign Application Priority Data

Jul. 25, 2014 (JP) .................................. 2014-151514

(51) Int. Cl.
| | |
|---|---|
| *G06F 3/0484* | (2013.01) |
| *G06T 7/00* | (2006.01) |
| *G06K 9/32* | (2006.01) |
| *G06T 11/60* | (2006.01) |

(52) U.S. Cl.
CPC ............. *G06F 3/04842* (2013.01); *G06K 9/32* (2013.01); *G06T 7/0081* (2013.01); *G06T 11/60* (2013.01); *G06T 2207/30176* (2013.01)

(58) Field of Classification Search
None
See application file for complete search history.

(56) References Cited

U.S. PATENT DOCUMENTS

2015/0052431 A1* 2/2015 Zhu .................... G06K 9/00671
715/716

FOREIGN PATENT DOCUMENTS

| JP | 2001-045266 A | 2/2001 |
|---|---|---|
| JP | 2013-205984 A | 10/2013 |

OTHER PUBLICATIONS

Tsuyoshi Kawaguchi et al; "Approximation of digitized curves by maximum perimeter polygons;" Institute of Electronics, Information, and Communication Engineers Journal; Nov. 1996; vol. J 79-D-11; No. 11; pp. 1800-1809.

* cited by examiner

*Primary Examiner* — Siamak Harandi
*Assistant Examiner* — Amandeep Saini
(74) *Attorney, Agent, or Firm* — Oliff PLC

(57) ABSTRACT

An information processing device includes a first region extracting unit that extracts a first region from a background image, the first region which should not be hidden in the background image; a second region extracting unit that extracts a second region from a form to be composed with the background image, a position of the second region being fixed in the form; and a controller that, when a form is selected and when a background image and a form are composed, if the composite meets a condition relating to overlap of the first region in the background image and the second region in the form, provides control so that a form including the second region is not allowed to be selected.

6 Claims, 18 Drawing Sheets

FIG. 4A
FIG. 4B
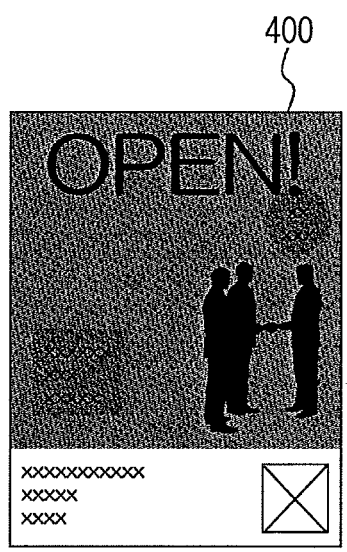
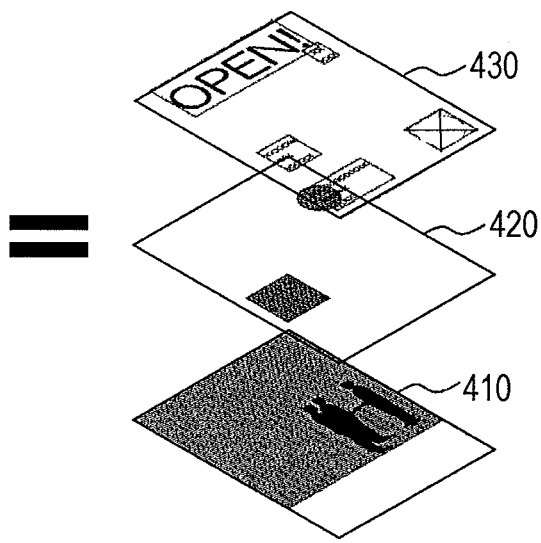

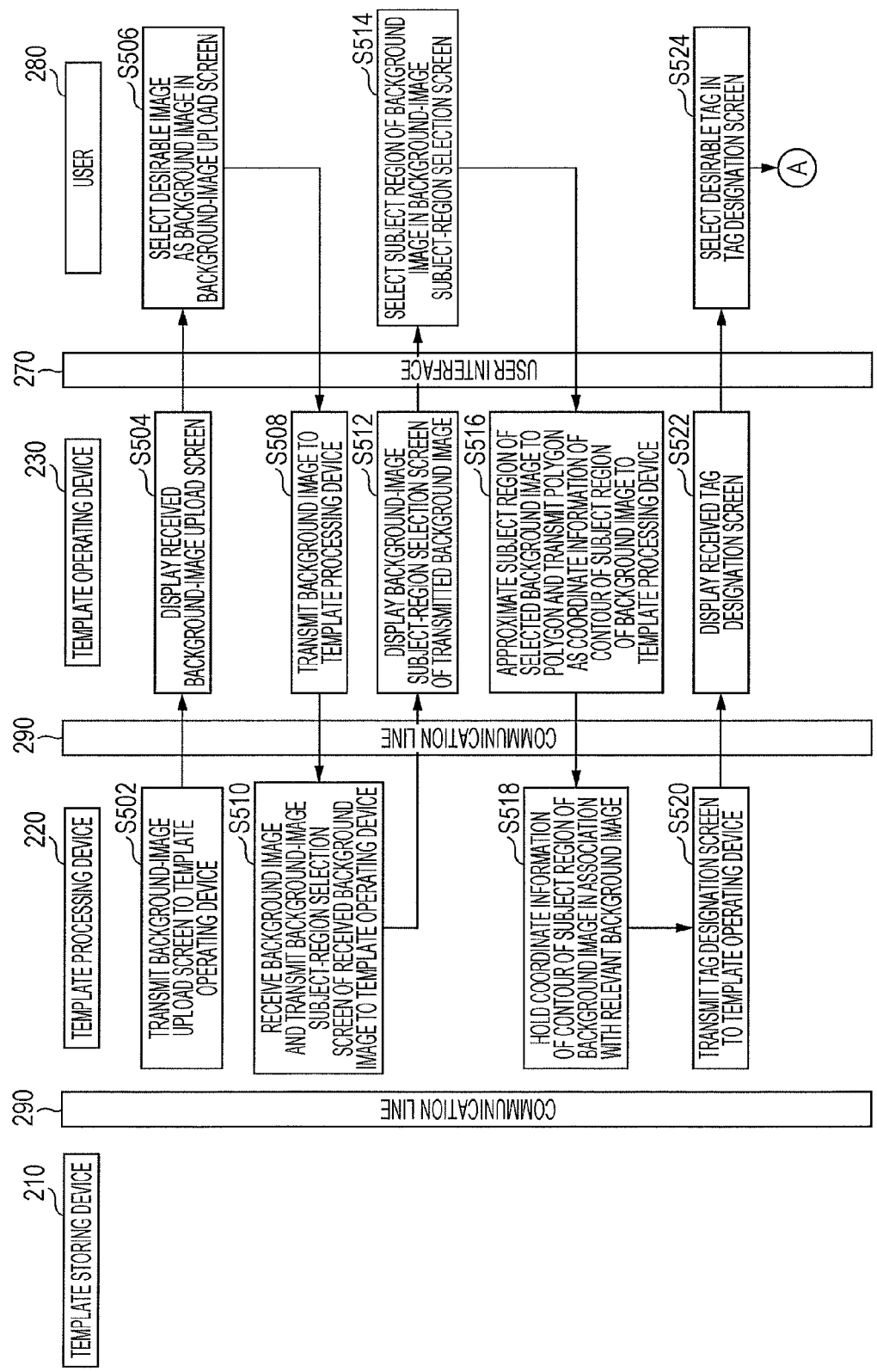

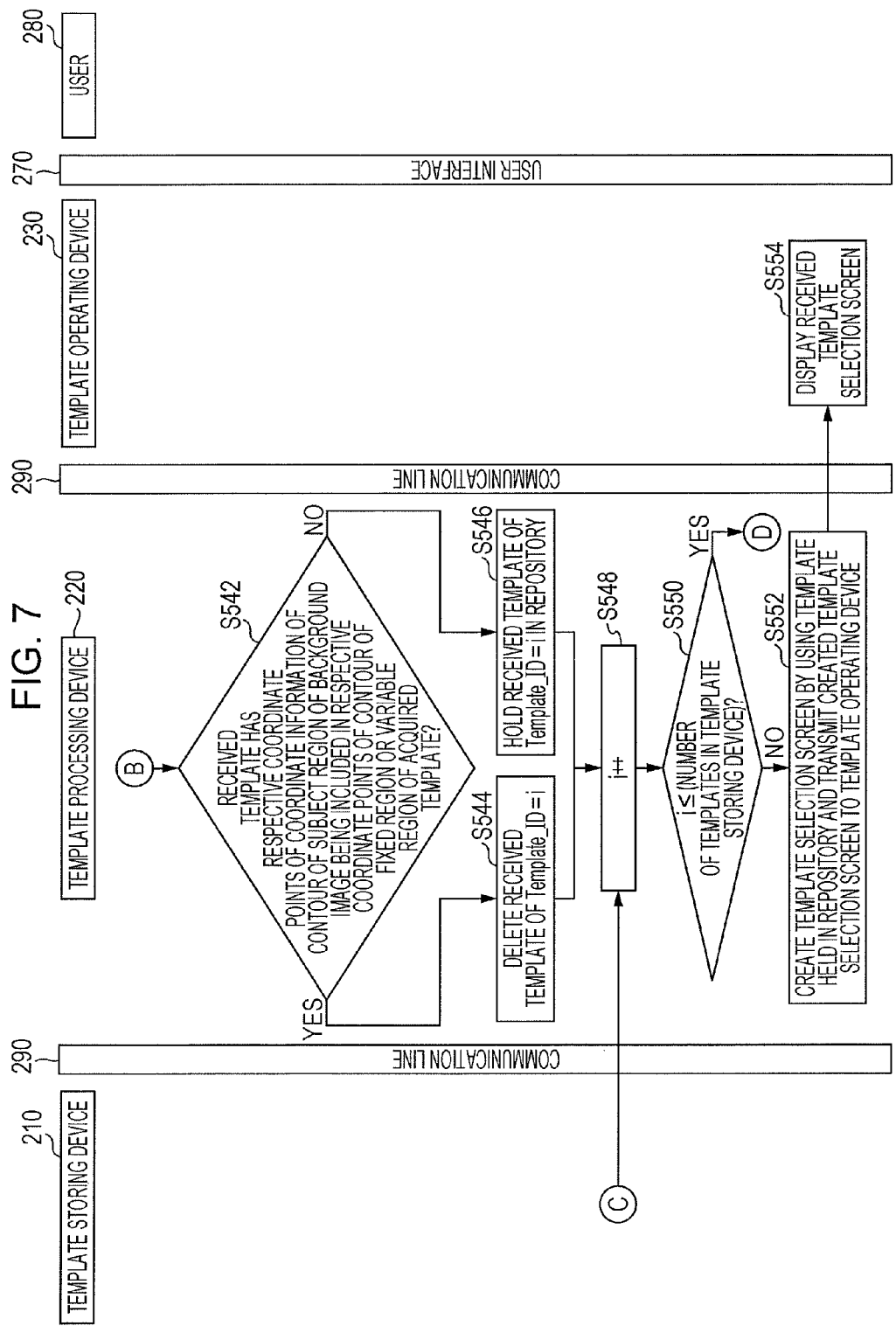

FIG. 10A  FIG. 10B  FIG. 10C
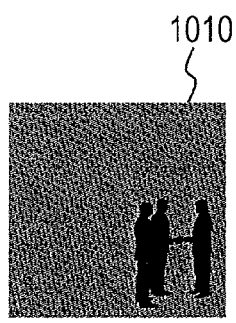 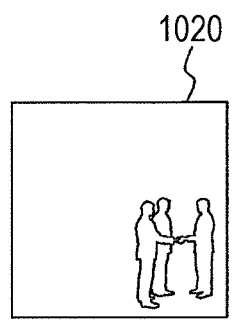 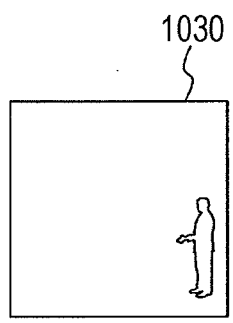
FIG. 11A  FIG. 11B
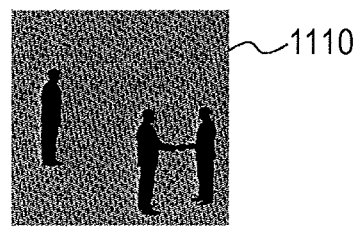 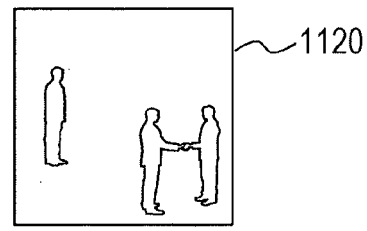

| Template_ID (2010) | Name (2020) |
|---|---|
| 1 | GORGEOUS BUSINESS CARD |
| 2 | COOL LEAFLET |

| TT_ID (2110) | Template_ID (2120) | Tag_ID (2130) |
|---|---|---|
| 1 | 1 | 1 |
| 2 | 1 | 4 |
| 3 | 2 | 2 |
| 4 | 2 | 3 |

| Tag_ID (2210) | Tag (2220) |
|---|---|
| 1 | BUSINESS CARD |
| 2 | LEAFLET |
| 3 | COOL |
| 4 | GORGEOUS |

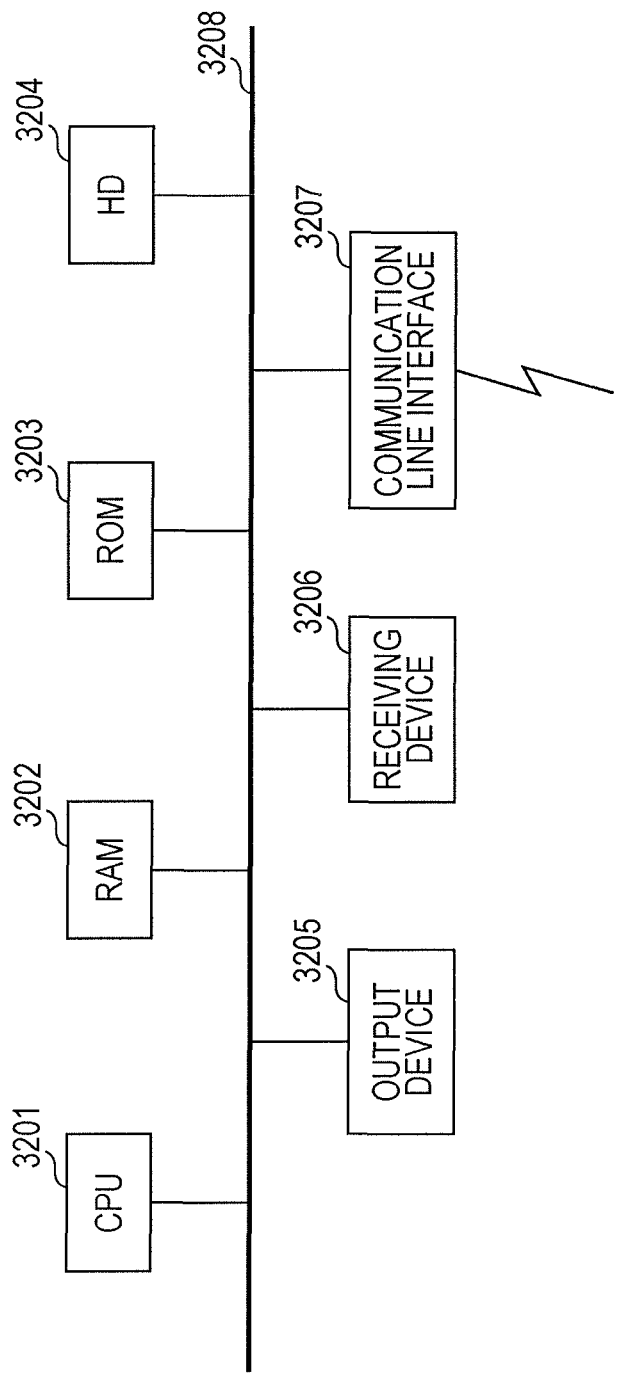

INFORMATION PROCESSING DEVICE, METHOD, AND STORAGE MEDIUM FOR EXCLUDING A REGION SELECTION IN A FORM

CROSS-REFERENCE TO RELATED APPLICATIONS

This application is based on and claims priority under 35 USC 119 from Japanese Patent Application No. 2014-151514 filed Jul. 25, 2014.

BACKGROUND

The present invention relates to an information processing device, an information processing method, and a storage medium.

SUMMARY

According to an aspect of the invention, there is provided an information processing device including a first region extracting unit that extracts a first region from a background image, the first region which should not be hidden in the background image; a second region extracting unit that extracts a second region from a form to be composed with the background image, a position of the second region being fixed in the form; and a controller that, when a form is selected and when a background image and a form are composed, if the composite meets a condition relating to overlap of the first region in the background image and the second region in the form, provides control so that a form including the second region is not allowed to be selected.

BRIEF DESCRIPTION OF THE DRAWINGS

An exemplary embodiment of the present invention will be described in detail based on the following figures, wherein:

FIGS. 4A and 4B are explanatory illustrations each showing a processing example according to the exemplary embodiment;

FIG. 5 is a flowchart showing a processing example according to the exemplary embodiment;

FIG. 7 is a flowchart showing the processing example according to the exemplary embodiment;

FIGS. 10A to 10C are explanatory illustrations each showing a processing example according to the exemplary embodiment;

FIGS. 11A and 11B are explanatory illustrations each showing a processing example according to the exemplary embodiment;

FIG. 20 is an explanatory illustration showing a data structure example of a template table;

FIG. 21 is an explanatory illustration showing a data structure example of a template tag table;

FIG. 22 is an explanatory illustration showing a data structure example of a tag table;

FIG. 32 is a block diagram showing a hardware configuration example of a computer that implements the exemplary embodiment.

DETAILED DESCRIPTION

An exemplary embodiment for implementing the invention is described below with reference to the drawings.

Figure 1:
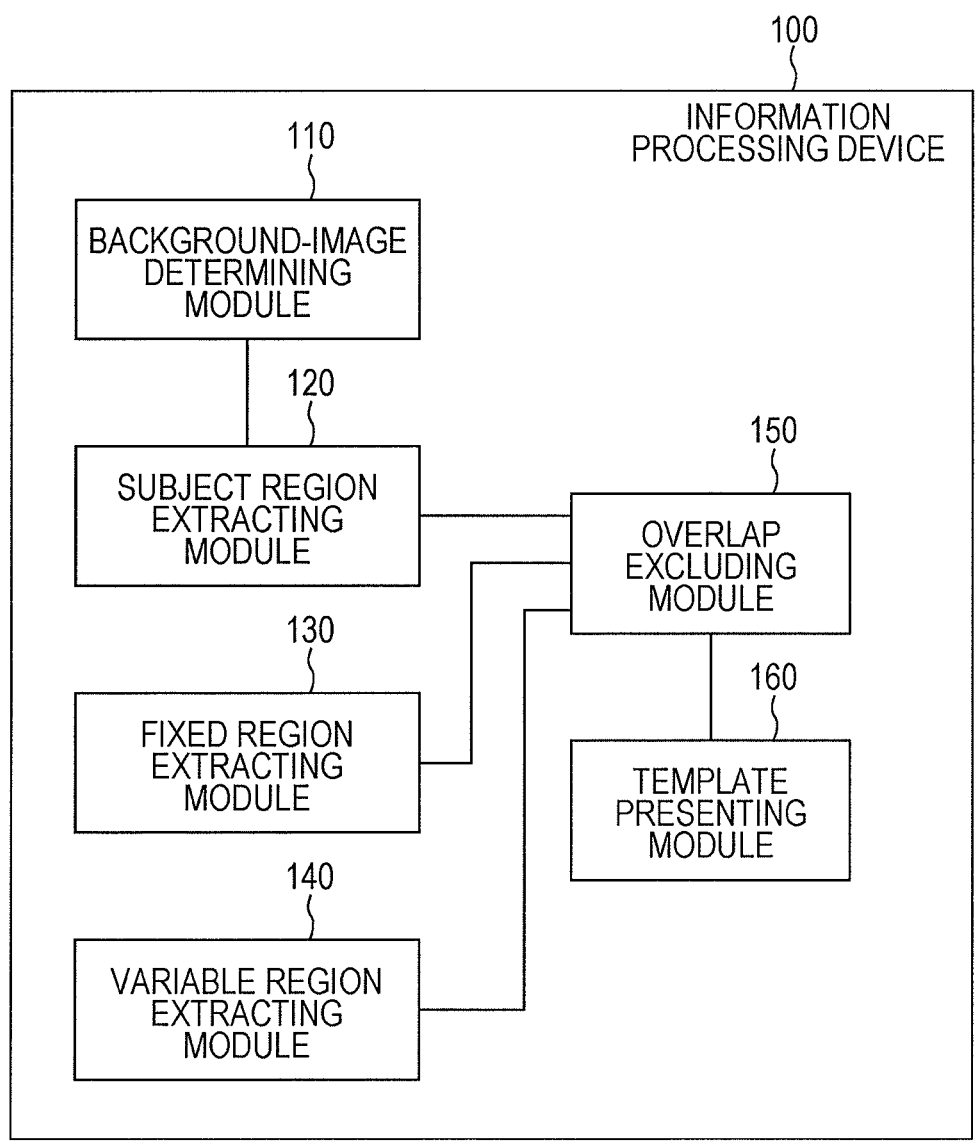
FIG. 1 is a conceptual module configuration diagram showing a configuration example according to an exemplary embodiment.

FIG. 1 is a conceptual module configuration diagram showing a configuration example according to this exemplary embodiment.

A module represents a component, such as software (a computer program) or hardware, which may be generally logically separated. Hence, a module in this exemplary embodiment represents not only a module being a computer program, but also a module being a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a memory to store . . . or controlling a memory to store . . . in the case in which the exemplary embodiment is a computer program. Also, modules may correspond to functions one by one. However, when being mounted, a single module may be formed of a single program, plural modules may be formed of a single program, or a single module may be formed of plural programs. Also, plural modules may be executed by a single computer, or a single module may be executed by plural computers in a distributed or parallel environment. A single module may include other module. Also, "connection" is used for physical connection, and logical connection (for example, transmission and reception of data, an instruction, or reference relationship among data). An expression "predetermined" represents being determined before subject processing. The situation includes a situation before processing according to this exemplary embodiment is started, and a situation even after processing according to this exemplary embodiment is started as long as the situation is before subject processing. In other words, the expression "predetermined" is used as being determined in accordance with the condition and state of the current situation, or the condition and state of the previous situation. If there are plural "predetermined values," the values may be different, or two or more values (of course, all the values) may be the same. Also, wordings "if A, do B" is used as "determining whether A or not, and doing B if it is determined as A," unless otherwise the determination whether A or not is not required.

Also, a system or a device includes a case in which a system or a device is formed of plural computers, hardware, plural devices, etc., connected by a communication measure such as a network (including communication connection in a one-to-one correspondence), and a case in which a system or a device is provided by a single computer, hardware, a single device, etc. "A device" and "a system" are used as mutually equivalent words. Of course, "a system" does not include a social "scheme" (social system) that is merely an artificial agreement.

Also, subject information is read from a memory every processing of each module or every processing if plural steps of processing are executed in a module, and after the processing, processing result is written out to the memory. Hence, the description of reading from the memory before the processing and writing out to the memory after the processing may be occasionally omitted. In this case, a memory may include a hard disk, a random access memory (RAM), an external storage medium, a memory arranged via a communication line, and a register in a central processing unit (CPU).

An information processing device 100 according to this exemplary embodiment selects a form for composing a background image and a form (hereinafter, also referred to as template). As shown in FIG. 1, the information processing device 100 includes a background-image determining module 110, a subject region extracting module 120, a fixed region extracting module 130, a variable region extracting module 140, an overlap excluding module 150, and a template presenting module 160.

A background image is composed with a form, and hence a document is created. For example, when a document (leaflet, WEB page, etc.) for sales promotion (including advertising etc.) is created, it is difficult to design and create a document from the beginning without professional knowledge.

Hence, a background image previously designed by a professional (however, a designer does not have to be a professional, and may be a semi-professional or an amateur, this is also applied to the following description) is composed with a form previously designed by a professional etc., and a document that meets its purpose is created. Multiple background images and multiple forms are prepared, and a user requires to select a background and a form.

Then, the user edits a region where the content, size, position, and so force, are allowed to be changed in a form, and the edited form is composed with a background image.

In an environment for creating a document, a form may be occasionally selected when a background image is already determined. For example, in a case in which a landscape of the location of a shop is selected as a background image, the background image is typically selected before a form is selected, for example, if the background image is determined on the basis of the characteristics of a product. The information processing device 100 is used in such a situation. In particular, the information processing device 100 is used when a background image is selected before a form is selected (the selection does not have to be a final selection, and may be temporary selection or selection as a candidate) and then a form is selected.

The background-image determining module 110 is connected to the subject region extracting module 120. The background-image determining module 110 determines a background image, and provides the background image to the subject region extracting module 120. The determined background image in this case may be a predetermined background image or a background image selected by a user. Also, the background image may be any image as long as the image is a document that is allowed to be composed with a form. For example, the background image may be a photograph image, a computer graphics (CG) image, a text image, etc.

The subject region extracting module 120 is connected to the background-image determining module 110 and the overlap excluding module 150. The subject region extracting module 120 extracts a first region (hereinafter, also referred to as subject region) from a background image. The first region should not be hidden in the background image. The first region is a part that is desirably not to be hidden in the background image ("being desirably not to be hidden" may be by a will of a user, or automatic extraction, which will be described later). For example, the first region may be a silhouette part of a person.

The fixed region extracting module 130 is connected to the overlap excluding module 150. The fixed region extracting module 130 extracts a second region (hereinafter, also referred to as fixed region) from a form to be composed with a background image. The position of the second region is fixed in the form, and input and deletion of a character or an image is inhibited in the second region. The second region is provided to the subject region extracting module 120.

A form may include the second region and additionally a third region (hereinafter, also referred to as variable region) in which a character and an image may be input in the form. The third region is a region that may be deleted without input of a character or an image if the third region is not required.

The variable region extracting module 140 is connected to the overlap excluding module 150. The variable region extracting module 140 extracts the third region from a form to be composed with a background image. The third region is provided to the subject region extracting module 120.

The overlap excluding module 150 is connected to the subject region extracting module 120, the fixed region extracting module 130, the variable region extracting module 140, and the template presenting module 160. When a form is selected and when a background image is composed with a form, if the composite meets a condition relating to overlap of the first region in the background image and the second region in the form, the overlap excluding module 150 controls the template presenting module 160 so that a form including the second region is not allowed to be selected.

In this case, "the condition relating to overlap" includes, for example, (1) a condition that the first region is completely hidden by the second region, (2) a condition that a part of the first region is hidden by the second region, and (3) a condition that a ratio of the area of the first region hidden by the second region (a ratio to the first region) is larger than a predetermined threshold, or equal to or larger than the predetermined threshold.

Also, when multiple forms are displayed and a form is selected from the displayed forms and when a background image is composed with a form, if the composite meets a condition relating to overlap of the first region in the background image and the third region in the form, the overlap excluding module 150 may control the template presenting module 160 so that a form including the third region is displayed with a lower priority than priorities of the other forms.

Also, if the content of the third region is determined, the overlap excluding module 150 may process the third region as the second region.

Also, if the second region is transparent, the overlap excluding module 150 may control the template presenting module 160 so that a form including the second region is allowed to be selected. In this case, being "transparent" indicates a state in which the first region is visible through the second region.

The template presenting module 160 is connected to the overlap excluding module 150. The template presenting module 160 provides displaying on a display such as a liquid crystal display so that a form may be selected according to the control by the overlap excluding module 150. To be specific, when multiple forms are displayed, a form controlled not to be selected by the overlap excluding module 150 is not displayed or is displayed with a decreased contrast so as not to be selected. Alternatively, the display may depend on the priority. For example, a form with a higher priority may be displayed at a position closer to the beginning (in a case of a list, displayed at a higher level position). In this case, a form with a lower priority set by the overlap excluding module 150 is located at a position closer to the end (displayed at a position being hard to be found because scrolling is required for display, or in the case of a list, displayed at a lower level position).

Then, the user selects a form to be composed with a background image, and performs an edit work etc. on the third region in the form. Thus, a document is completed.

Figure 2:
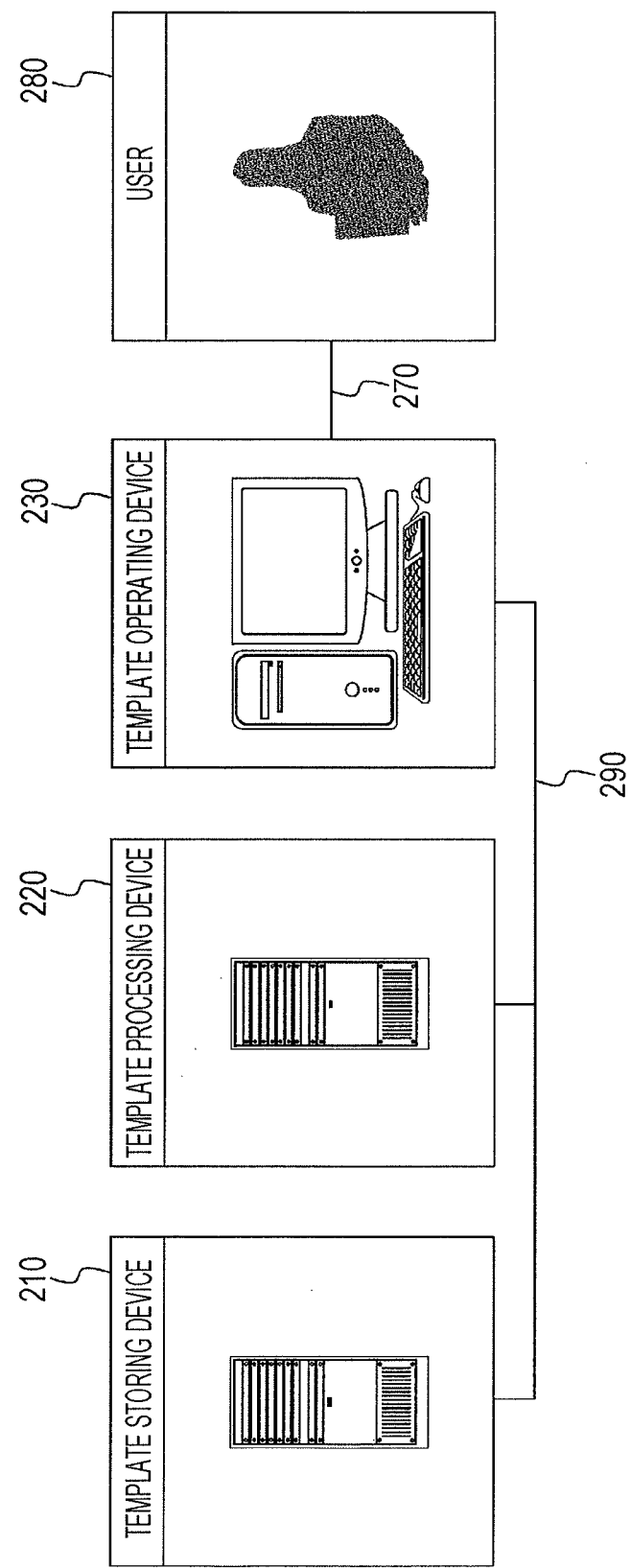
FIG. 2 is an explanatory illustration showing a relationship example among a template storing device, a template processing device, and a template operating device.

FIG. 2 is an explanatory illustration showing a relationship example among a template storing device 210, a template processing device 220, and a template operating device 230.

The template storing device 210, the template processing device 220, and the template operating device 230 are connected to each other through a communication line 290. These devices may be formed as the same device if required.

A user 280 uses the template operating device 230 through a user interface 270, such as a monitor, a keyboard, a mouse, or a touch panel. The information processing device 100 may be formed in any of the template storing device 210, the template processing device 220, and the template operating device 230. For example, described below is a case in which the information processing device 100 is formed in the template processing device 220.

The template storing device 210 stores, for example, background images and templates, and performs search processing etc. The template storing device 210 stores templates and template-related information, and provides the templates and the template-related information to the template processing device 220. For example, the template storing device 210 may be a typical database server. The template-related information is various pieces of information relating to templates. For example, the template-related information may be positional information of "a fixed region" or positional information of "a variable region."

The template processing device 220 performs, for example, document generation processing, such as generating a background image and a template, and composing a background image and a template.

For example, the template processing device 220 performs desirable processing in response to a HyperText Transfer Protocol (HTTP) request from the template operating device 230, and the template processing device 220 provides a response of a desirable screen to the template operating device 230. The template processing device 220 has a function as a WEB server. To allow a template with a design, in which "a subject region of a background image" is hidden, to be excluded from the search result, the user 280 may be allowed to select "the subject region of the background region" through the template operating device 230. Although described later, the subject region of "the background image" may be automatically extracted. Next, overlap of "the subject region of the background image" with "the fixed region" or "the variable region" of the template is inspected.

The template operating device 230 requests the template storing device 210 and the template processing device 220 to perform processing in accordance with an operation by the user 280, receives the result, and provides display etc.

For example, the user 280 selects a template from a list screen through the user interface 270 of the template operating device 230. After a desirable background image is selected, a list of templates proper for the selected background image is displayed. The template operating device 230 may be a typical client PC that may be operated by the user 280.

Figure 3:
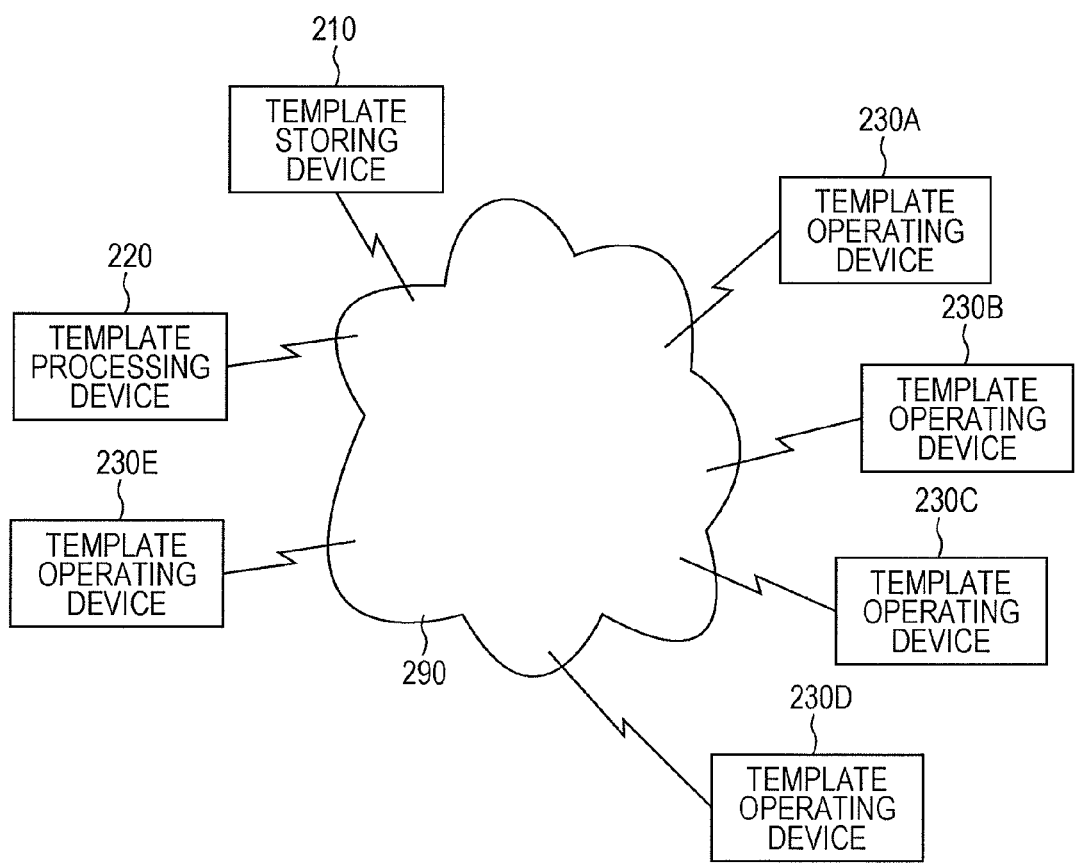
FIG. 3 is an explanatory illustration showing a system configuration example when the exemplary embodiment is implemented.

FIG. 3 is an explanatory illustration showing a system configuration example when the exemplary embodiment is implemented.

The template storing device 210, the template processing device 220, a template operating device 230A, a template operating device 230B, a template operating device 230C, a template operating device 230D, and a template operating device 230E are connected to each other through the communication line 290. The communication line 290 may be wireless, wired, or combination of wireless and wired configurations. For example, the communication line 290 may be the Internet, an intranet, or the like, as a communication infrastructure. The template storing device 210 and the template processing device 220 may be used from each template operating device 230.

FIGS. 4A and 4B are explanatory illustrations each showing a processing example according to the exemplary embodiment.

A complete document 400 is a composite of a background image 410, with a fixed region 420 and a variable region 430 of a template. The order of composition (the order of layers) may be that the background image 410 is placed at a bottom position, and the fixed region 420 and the variable region 430 are placed thereon. The order of the fixed region 420 and the variable region 430 is not particularly determined. Typically, the fixed region 420 is placed on the background image 410, and the variable region 430 is placed on the fixed region 420. The fixed region 420 has set therein a region the position of which is fixed. The variable region 430 has set therein a region that allows a text etc. to be input.

In the description, the background image and the template are provided. However, the background image does not have to be excluded from the template, and the template may include the background image 410. In this case, a background image (the background image 410) may serve as a template A, a template including the second region (the fixed region 420) may serve as a template B, and a template including the third region (the variable region 430) may serve as a template C. In this case, the entire template includes three templates including the template A, the template B, and the template C.

Figure 6:
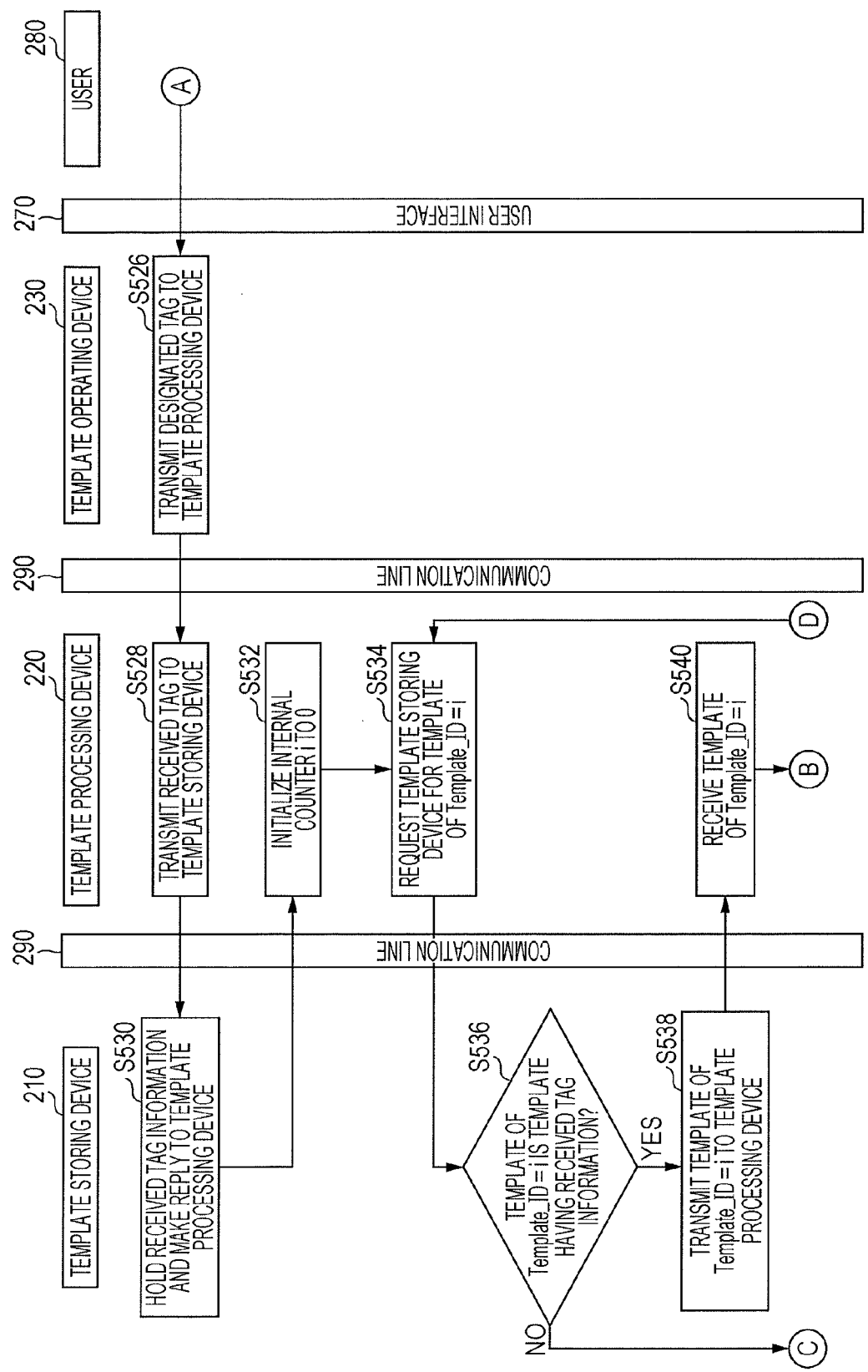
FIG. 6 is a flowchart showing the processing example according to the exemplary embodiment.

FIGS. 5 to 7 are flowcharts each showing a processing example according to this exemplary embodiment. FIGS. 5 to 7 indicate processing contents of the template storing device 210, the template processing device 220, the template operating device 230, and the user 280. The processing by the user 280 may be processing of selection and so forth executed such that the template operating device 230 detects an operation on a keyboard, a mouse, a touch panel, or the like, and the template operating device 230 executes processing such as selection.

The template storing device 210 performs processing in steps S530, S536, and S538.

The template processing device 220 performs processing in steps S502, S510, S518, S520, S528, S532, S534, S540, S542, S544, S546, S548, S550, and S552.

The template operating device 230 performs processing in steps S504, S508, S512, S516, S522, S526, and S554, The user 280 performs processing in steps S506, S514, and S524.

In step S502, "a background-image upload screen" is transmitted to the template operating device 230.

In step S504, the received "background-image upload screen" is displayed.

In step S506, a desirable image is selected as "a background image" in "the background-image upload screen." If images are stored in the template operating device 230 and the template storing device 210, a desirable background image may be selected from the images.

In step S508, "the background image" is transmitted to the template processing device 220.

In step S510, "the background image" is received, and "a background-image subject-region selection screen" of the received "background image" to the template operating device 230.

In step S512, "the background-image subject-region selection screen" of the transmitted "background image" is displayed.

In step S514, "a subject region of the background image" is selected in "the background-image subject-region selection screen." In a case of a simple image such as an illustration with a small number of colors, the template operating device 230 may automatically extract and select a subject region by using a typical contour extraction algorithm.

In step S516, the selected "subject region of the background image" is approximated to a polygon and the polygon is transmitted as "coordinate information of a contour of the subject region of the background image" to the template processing device 220. If a selection range is a curved line, the selection range may be approximated to a polygon by using, for example, an algorithm of "Approximation of Digitalized Curves by Polygons" which is typically known. For example, an algorithm described in 'Tsuyoshi KAWAGUCHI, Makoto NAGAO, Approximation of Digitalized Curves by Maximum Perimeter Polygons, "IEICE Transactions of The Institute of Electronics, Information and Communication Engineers, D-II, Information and Systems, II-Information Processing," J79-D-2 (11), 1800-1809, 1996-11-25.'

The approximation degree (polygonal shape of approximation) may be set with regard to processing performance of the template processing device 220. Of course, if the approximation degree is higher (the number of sides is larger), the accuracy of later region judgment is increased.

In step S518, "the coordinate information of the contour of the subject region of the background image" is held in association with a relevant "background image." In this case, "association" represents making correspondence. The method is not particularly limited as long as "the coordinate information of the contour of the subject region of the background image" may be extracted from "the background image."

In step S520, "a tag designation screen" is transmitted to the template operating device 230.

In step S522, the received "tag designation screen" is displayed.

In step S524, a desirable tag is selected in "the tag designation screen."

In step S526, the designated "tag" is transmitted to the template processing device 220.

In step S528, the received "tag" is transmitted to the template storing device 210.

In step S530, the received "tag" information is held and a reply is made to the template processing device 220.

In step S532, an internal counter i is initialized to 0. In step S534, a request is made to the template storing device 210 for a template of a variable Template_ID=i.

In step S536, it is determined whether or not the template of Template_ID=i is a template having the received "tag" information. If the template is the template having the received "tag" information, the processing goes to step S538. Otherwise, the processing goes to step S548.

In step S538, the template of Template_ID=i is transmitted to the template processing device 220.

In step S540, the template of Template_ID=i is received.

In step S542, it is determined whether or not the received template has respective coordinate points of "the coordinate information of the contour of the subject region of the background image" being included in respective coordinate points of the contour of "the fixed region" or "the variable region" of the acquired template. If the respective coordinates are included, the processing goes to step S544. Otherwise, the processing goes to step S546. The included situation indicates a situation in which two regions overlap with each other (the first region is hidden by the second region).

The respective coordinate points of the contours of "the fixed region" and "the variable region" are determined from coordinates of respective vertexes of the contours of the respective regions held in a coordinate table 2500 (described later). In this case, the inside/outside judgment may be provided by using an algorithm of a typical "inside/outside judgment for a polygon with points." For example, an algorithm described in 'Keiu MORIMOTO, Kazunori YAMAGUCHI, Recursive Subdivision Methods and Subspace Classification: The Application to Identify Areas Bounded with Curves, "IPSJ Journal of Information Processing Society of Japan," 35 (5), 828-838, 1994-05-15.'

In step S544, the received template of Template_ID=i is deleted.

In step S546, the received template of Template_ID=i is held in a repository.

In step S548, i++(an increment of a variable i) is set.

In step S550, it is judged whether or not i≥ (the number of templates in the template storing device). If i (the number of templates in the template storing device), the processing returns to step S534. Otherwise, the processing goes to step S552.

In step S552, "the template selection screen" is created by using the template held in the repository and the created "template selection screen" is transmitted to the template operating device 230.

In step S554, the received "template selection screen" is displayed.

Processing performed by the subject region extracting module 120 is described by using examples in FIGS. 8A to 11. The subject region extracting module 120 extracts "a subject region" that is not desired to be hidden from a background image desired to be used.

Figure 8A:
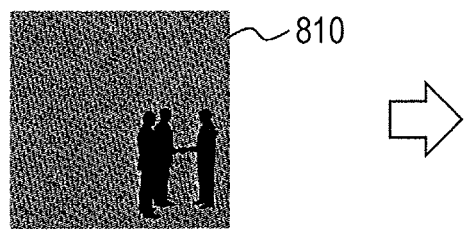
FIGS. 8A and 8B are explanatory illustrations each showing a processing example according to the exemplary embodiment.
Figure 8B:
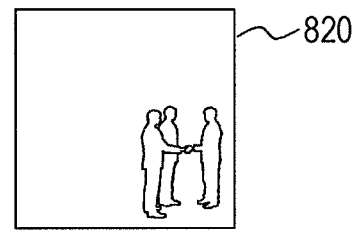

FIGS. 8A and 8B are explanatory illustrations each showing a processing example according to this exemplary embodiment (the subject region extracting module 120).

The processing result of the subject region extracting module 120 for a background image 810 shown in the example in FIG. 8A is a subject-region extraction result 820 shown in the example in FIG. 8B.

The subject region extracting module 120 automatically extracts a subject region by using an image discrimination technology. For example, it is assumed that a subject in the background image 810 is silhouettes of persons. The silhouettes of the persons (specifically, coordinate information of a link) are extracted by using the image discrimination technology.

Figure 9A:
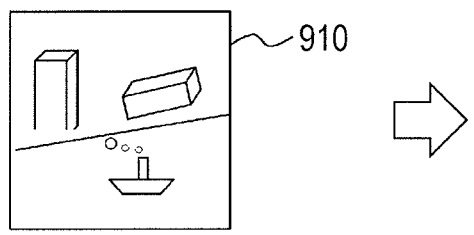
FIGS. 9A and 9B are explanatory illustrations each showing a processing example according to the exemplary embodiment.
Figure 9B:
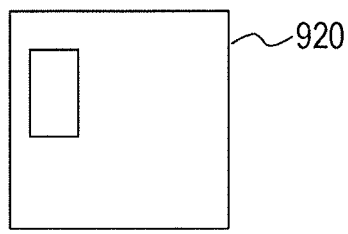

FIGS. 9A and 9B are explanatory illustrations each showing a processing example according to this exemplary embodiment (the subject region extracting module 120).

The processing result of the subject region extracting module 120 for a background image 910 shown in the example in FIG. 9A is a subject-region extraction result 920 shown in the example in FIG. 9B.

If the subject region extracting module 120 is not allowed to use the image discrimination technology (or although the subject region extracting module 120 uses the image discrimination technology, if the subject region extracting module 120 is not able to extract a subject region), the subject region extracting module 120 manually selects "a subject region" (in accordance with an operation by a user).

It is assumed that a subject of the background image 910 is a high building. Since the subject region is not able to be extracted by the image discrimination technology, a rectangle including the building is manually extracted.

FIGS. 10A to 10C are explanatory illustrations each showing a processing example according to this exemplary embodiment (the subject region extracting module 120).

The processing result of the subject region extracting module 120 for a background image 1010 shown in the example in FIG. 10A is a subject-region extraction result 1020 shown in the example in FIG. 10B. Further, the processing result of the subject region extracting module 120 for the subject-region extraction result 1020 is a subject-region correction result 1030 shown in the example in FIG. 10C.

The subject region extracting module 120 may manually add correction after the automatic extraction.

The subject region is automatically extracted by using the image discrimination technology. For example, it is assumed that a subject in the background image 1010 is silhouettes of persons. By using the image discrimination technology, the silhouettes of the persons are extracted and hence the subject-region extraction result 1020 is obtained. Further, to limit the subject to a person at the most right side among the silhouettes of the persons, the silhouette of the person at the most right side is manually extracted.

FIGS. 11A and 11B are explanatory illustrations each showing a processing example according to this exemplary embodiment (the subject region extracting module 120).

The processing result of the subject region extracting module 120 for a background image 1110 shown in the example in FIG. 11A is a subject-region extraction result 1120 shown in the example in FIG. 11B.

The subject region extracting module 120 may extract plural subject regions.

For example, it is assumed that subjects in the background image 1110 are silhouettes of persons located at two separate positions. By using the image discrimination technology, the silhouettes (at two positions) of the persons are extracted and hence the subject-region extraction result 1120 is obtained.

Processing performed by the overlap excluding module 150 is described by using examples in FIGS. 12 to 19.

The overlap excluding module 150 composes a subject region in a background image extracted by the subject region extracting module 120 with a fixed region or a variable region. Then, the overlap excluding module 150 detects the presence of overlap of the subject region of the background image with other region. Then, the overlap excluding module 150 excludes a template with overlap from search candidates.

Figure 12:
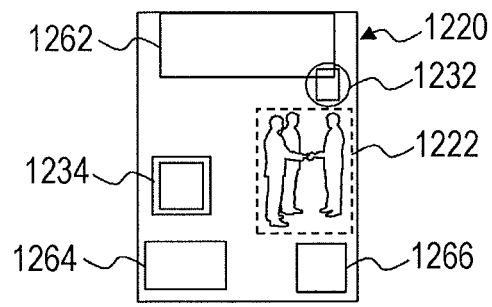
FIG. 12 is an explanatory illustration showing a processing example according to the exemplary embodiment.

FIG. 12 is an explanatory illustration showing a processing example according to this exemplary embodiment (the overlap excluding module 150). A composite image 1220 includes a subject region 1222, a fixed region 1232, a fixed region 1234, a variable region 1262, a variable region 1264, and a variable region 1266. This example represents a case in which the extracted subject region 1222 of the background image and the fixed region 1234 do not overlap each other.

The template with this arrangement (possibly the composite image 1220 or a template including the fixed region 1232) is displayed in the list of the template selection screen.

Figure 13:
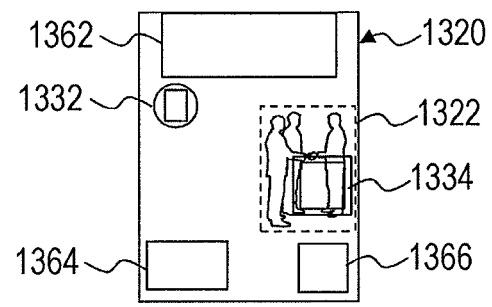
FIG. 13 is an explanatory illustration showing a processing example according to the exemplary embodiment.

FIG. 13 is an explanatory illustration showing a processing example according to this exemplary embodiment (the overlap excluding module 150). A composite image 1320 includes a subject region 1322, a fixed region 1332, a fixed region 1334, a variable region 1362, a variable region 1364, and a variable region 1366. This example represents a case in which the extracted subject region 1322 of the background image and the fixed region 1334 overlap each other.

The template with this arrangement is not displayed in the list of the template selection screen (the template is excluded).

Figure 14:
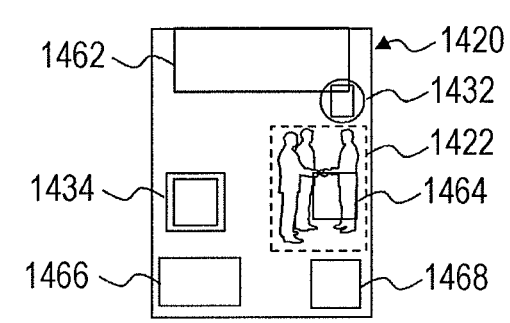
FIG. 14 is an explanatory illustration showing a processing example according to the exemplary embodiment.

FIG. 14 is an explanatory illustration showing a processing example according to this exemplary embodiment (the overlap excluding module 150). A composite image 1420 includes a subject region 1422, a fixed region 1432, a fixed region 1434, a variable region 1462, a variable region 1464, a variable region 1466, and a variable region 1468. This example represents a case in which the extracted subject region 1422 of the background image and the variable region 1464 overlap each other.

The template with this arrangement is displayed in the list of the template selection screen. However, the template is displayed at the end of the list. This is because a text or the like may be written in the variable region and may be deleted from the variable region.

Figure 15:
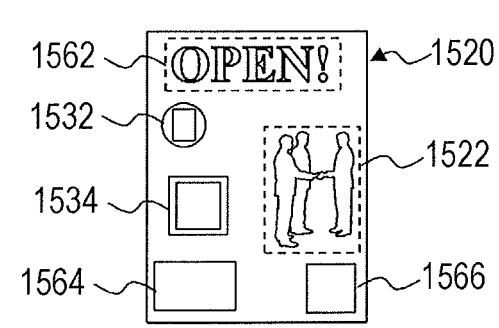
FIG. 15 is an explanatory illustration showing a processing example according to the exemplary embodiment.

FIG. 15 is an explanatory illustration showing a processing example according to this exemplary embodiment (the overlap excluding module 150). A composite image 1520 includes a subject region 1522, a fixed region 1532, a fixed region 1534, a variable region 1562, a variable region 1564, and a variable region 1566. This example represents a case in which not only the background image desired to be used but also characters written in the variable region 1562 are previously determined. The presence of overlap of the extracted subject region 1522 of the background image with the fixed regions (1532, 1534), the variable regions (1564, 1566) with the content being empty, and the variable region 1562 with the characters written is checked. In this case, since the subject region 1522 does not overlap the variable region 1562, the template with this arrangement is displayed in the list of the template selection screen.

Figure 16:
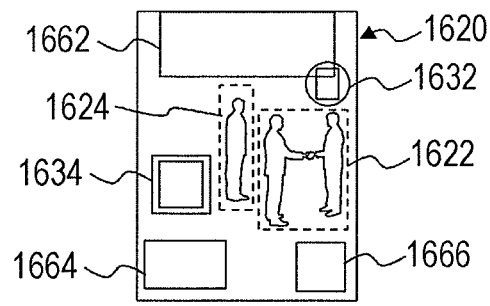
FIG. 16 is an explanatory illustration showing a processing example according to the exemplary embodiment.
Figure 17:
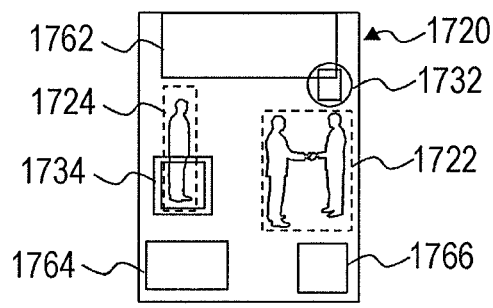
FIG. 17 is an explanatory illustration showing a processing example according to the exemplary embodiment.
Figure 18:
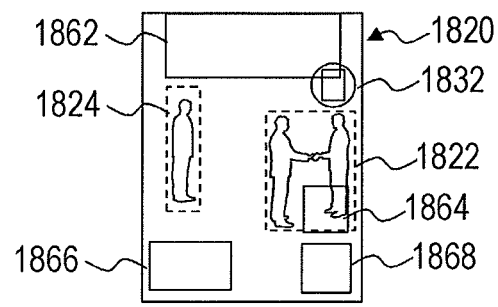
FIG. 18 is an explanatory illustration showing a processing example according to the exemplary embodiment.

Examples in FIGS. 16 to 18 indicate examples when plural subject regions of a background image are present. Processing is similar to processing for a single subject region. That is, selection is not allowed as long as even one overlap relationship is present among subject regions.

FIG. 16 is an explanatory illustration showing a processing example according to this exemplary embodiment (the overlap excluding module 150). A composite image 1620 includes a subject region 1622, a subject region 1624, a fixed region 1632, a fixed region 1634, a variable region 1662, a variable region 1664, and a variable region 1666. The subject region 1622 or the subject region 1624 does not overlap the fixed regions 1632 and 1634. Hence the template is displayed in the list of the template selection screen.

FIG. 17 is an explanatory illustration showing a processing example according to this exemplary embodiment (the overlap excluding module 150). A composite image 1720 includes a subject region 1722, a subject region 1724, a fixed region 1732, a fixed region 1734, a variable region 1762, a variable region 1764, and a variable region 1766. The subject region 1724 overlaps the fixed region 1734. Hence, the template is not displayed in the list of the template selection screen.

FIG. 18 is an explanatory illustration showing a processing example according to this exemplary embodiment (the overlap excluding module 150). A composite image 1820 includes a subject region 1822, a subject region 1824, a fixed region 1832, a variable region 1862, a variable region 1864, a variable region 1866, and a variable region 1868. The subject region 1822 or the subject region 1824 does not overlap the fixed region 1832. However, the subject region 1822 overlaps the variable region 1864. Hence, the template is displayed at the end of the list of the template selection screen.

Figure 19:
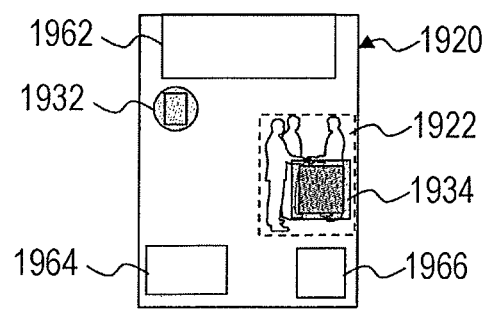
FIG. 19 is an explanatory illustration showing a processing example according to the exemplary embodiment.

FIG. 19 is an explanatory illustration showing a processing example according to this exemplary embodiment (the overlap excluding module 150). The example represents a case in which fixed regions (a fixed region (transparent) 1932, a fixed region (transparent) 1934) are transparent images.

A composite image 1920 includes a subject region 1922, the fixed region (transparent) 1932, the fixed region (transparent) 1934, a variable region 1962, a variable region 1964, and a variable region 1966. Although the subject region 1922 of the background image overlaps the fixed region (transparent) 1934, since the fixed region (transparent) 1934 is a transparent region and the subject region 1922 is visible, the template is displayed in the list of the template selection screen. However, the template is displayed at the end of the list.

Data to be processed by the information processing device 100 is described by using examples in FIGS. 20 to 27.

FIG. 20 is an explanatory illustration showing a data structure example of a template table 2000. The template table 2000 includes a Template_ID column 2010, and a Name column 2020. In this exemplary embodiment, the Template_ID column 2010 stores information for uniquely identifying a template (template ID: identification). The Name column 2020 stores a name of the corresponding template.

FIG. 21 is an explanatory illustration showing a data structure example of a template tag table 2100. The template tag table 2100 includes a TT_ID column 2110, a Template_ID column 2120, and a Tag_ID column 2130. In this exemplary embodiment, the TT_ID column 2110 stores information (TT_ID) for uniquely identifying a combination of a template and a tag. The Template_ID column 2120 stores a template ID. In this exemplary embodiment, the Tag_ID column 2130 stores a tag to be combined with the corresponding template, the tag being information (tag ID) for uniquely identifying a tag.

FIG. 22 is an explanatory illustration showing a data structure example of a tag table 2200. The tag table 2200 includes a Tag_ID column 2210, and a Tag column 2220. The Tag_ID column 2210 stores a Tag ID. The Tag column 2220 stores a tag.

Figure 23:
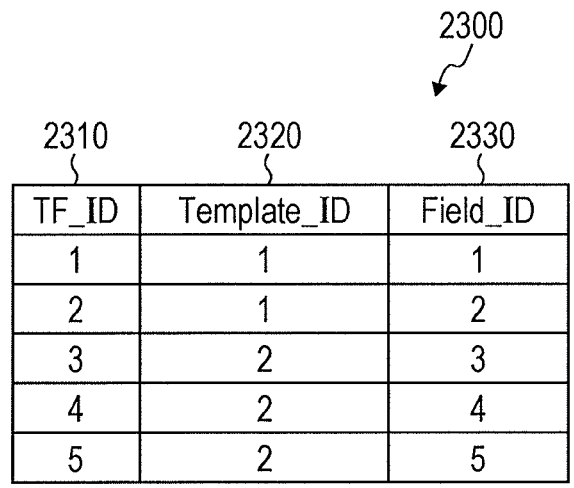
FIG. 23 is an explanatory illustration showing a data structure example of a template field table.

FIG. 23 is an explanatory illustration showing a data structure example of a template field table 2300. The template field table 2300 includes a TF_ID column 2310, a Template_ID column 2320, and a Field_ID column 2330. In this exemplary embodiment, the TF_ID column 2310 stores information (TF_ID) for uniquely identifying a combination of a template and a field. The Template_ID column 2320 stores a template ID. In this exemplary embodiment, the Field_ID column 2330 stores a field to be combined with the corresponding template, the field being information (field ID) for uniquely identifying a field.

Figure 24:
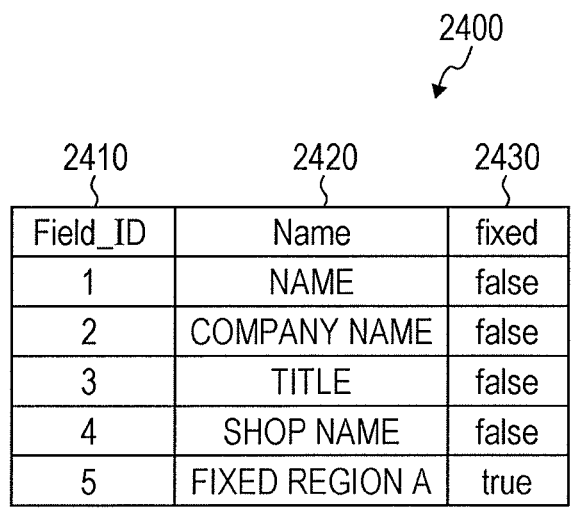
FIG. 24 is an explanatory illustration showing a data structure example of a field table.

FIG. 24 is an explanatory illustration showing a data structure example of a field table 2400. The field table 2400 includes a Field_ID column 2410, a Name column 2420, and a fixed column 2430, and indicates whether a subject field is a fixed region or a variable region. The Field_ID column 2410 stores a field ID. The Name column 2420 stores a name of the corresponding field. The fixed column 2430 stores whether the field is a fixed region or not. If the field is a fixed region, "true" is written. If the field is a variable region, "false" is written.

Figure 25:
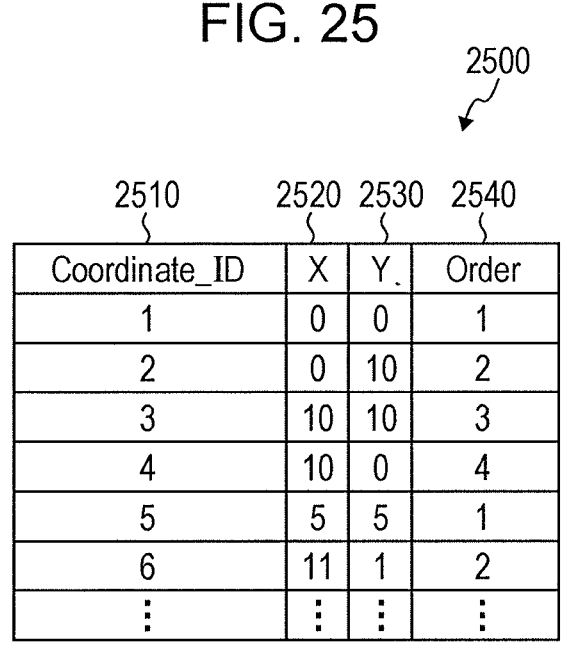
FIG. 25 is an explanatory illustration showing a data structure example of a coordinate table.

FIG. 25 is an explanatory illustration showing a data structure example of the coordinate table 2500. The coordinate table 2500 includes a Coordinate_ID column 2510, an X column 2520, a Y column 2530, and an Order column 2540, and stores coordinate information of vertexes of contours (subject region, fixed region, variable region). In this exemplary embodiment, the Coordinate_ID column

2510 stores information for uniquely identifying a vertex (coordinate ID). The X column 2520 stores an X coordinate of the corresponding vertex. The Y column 2530 stores a Y coordinate of the corresponding vertex. The Order column 2540 stores an order of the corresponding vertex.

Figure 26:
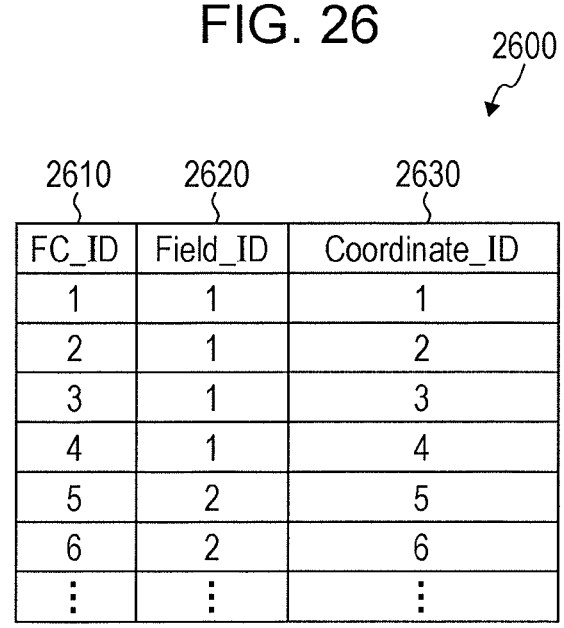
FIG. 26 is an explanatory illustration showing a data structure example of a field coordinate table.

FIG. 26 is an explanatory illustration showing a data structure example of a field coordinate table 2600. The field coordinate table 2600 includes an FC_ID column 2610, a Field_ID column 2620, and a Coordinate_ID column 2630, and stores a region of a field. In this exemplary embodiment, the FC_ID column 2610 stores information (FC_ID) for uniquely identifying a vertex of a field. The Field_ID column 2620 stores a field ID. The Coordinate_ID column 2630 stores a coordinate ID.

Figure 27:
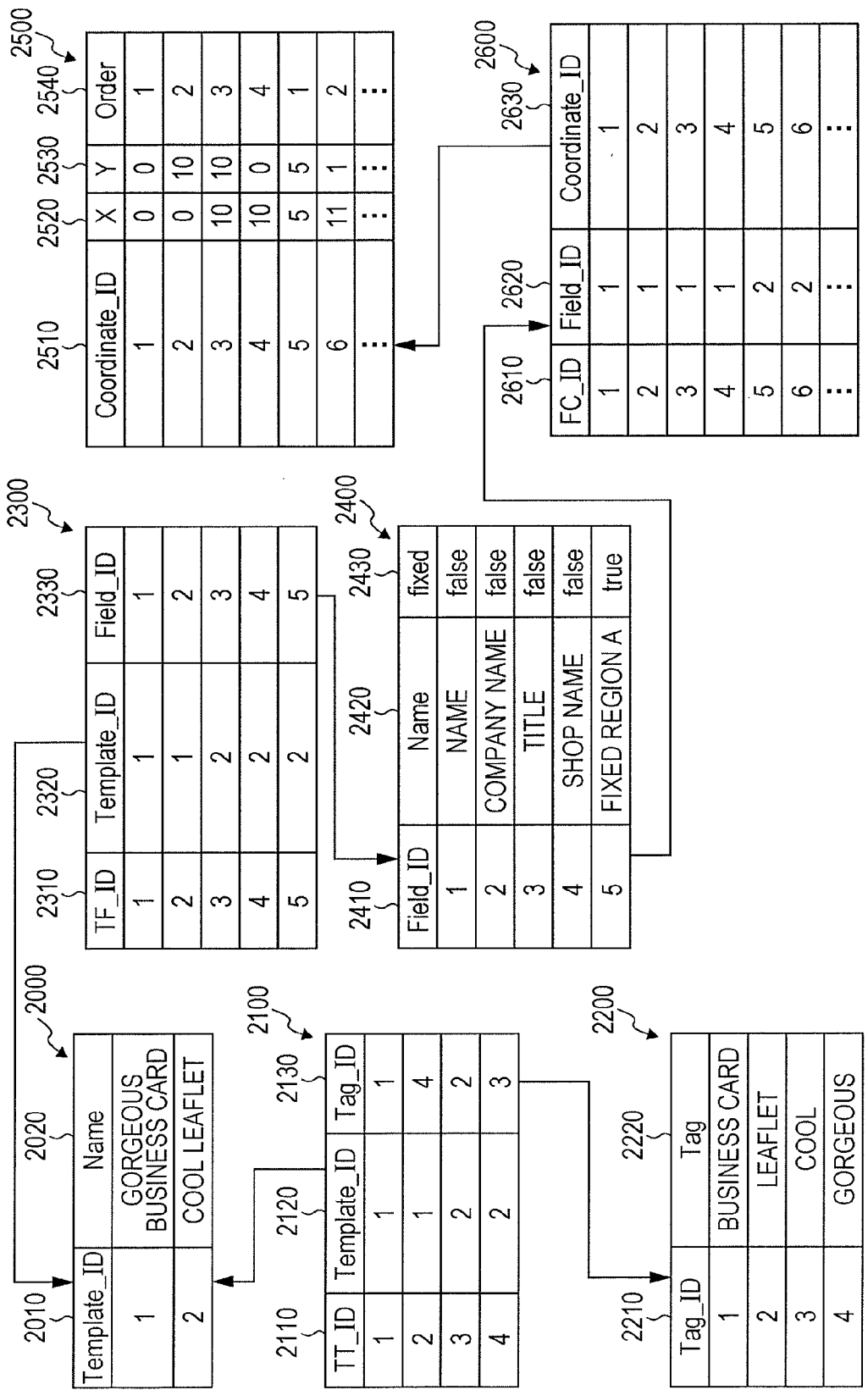
FIG. 27 is an explanatory illustration showing a relationship example among the template table, the template tag table, etc.

FIG. 27 is an explanatory illustration showing a relationship example among the template table 2000, the template tag table 2100, the tag table 2200, the template field table 2300, the field table 2400, the coordinate table 2500, and the field coordinate table 2600.

The Template_ID column 2010 in the template table 2000 corresponds to the Template_ID column 2120 in the template tag table 2100 and the Template_ID column 2320 in the template field table 2300. The Template_ID column 2120 in the template tag table 2100 corresponds to the Template_ID column 2010 in the template table 2000. The Tag_ID column 2130 in the template tag table 2100 corresponds to the Tag_ID column 2210 in the tag table 2200. The Template_ID column 2320 in the template field table 2300 corresponds to the Template_ID column 2010 in the template table 2000. The Field_ID column 2330 in the template field table 2300 corresponds to the Field_ID column 2410 in the field table 2400. The Field_ID column 2410 in the field table 2400 corresponds to the Field_ID column 2330 in the template field table 2300 and the Field_ID column 2620 in the field coordinate table 2600. The Coordinate_ID column 2510 in the coordinate table 2500 corresponds to the Coordinate_ID column 2630 in the field coordinate table 2600. The Field_ID column 2620 in the field coordinate table 2600 corresponds to the Field_ID column 2410 in the field table 2400. The Coordinate_ID column 2630 in the field coordinate table 2600 corresponds to the Coordinate_ID column 2510 in the coordinate table 2500.

Figure 28:
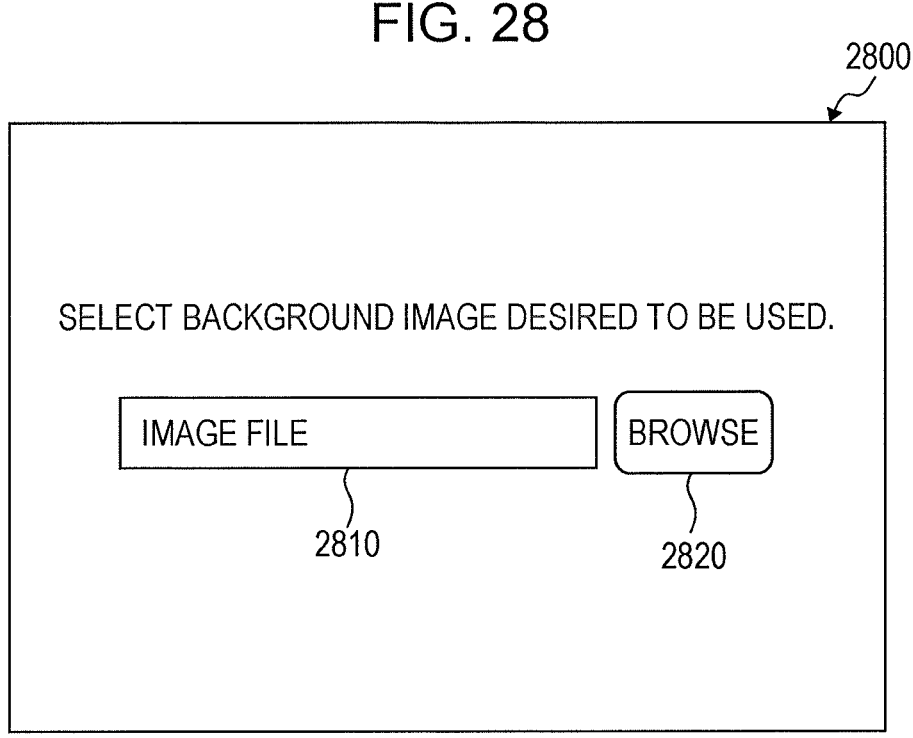
FIG. 28 is an explanatory illustration showing a display example of a background-image upload screen.

FIG. 28 is an explanatory illustration showing a display example of a background-image upload screen 2800 according to the template field table 2300. The background-image upload screen 2800 is a screen for selecting an image file and uploading the image file. In the background-image upload screen 2800, an image file designation column 2810, and a browse button 2820 are displayed.

Figure 29:
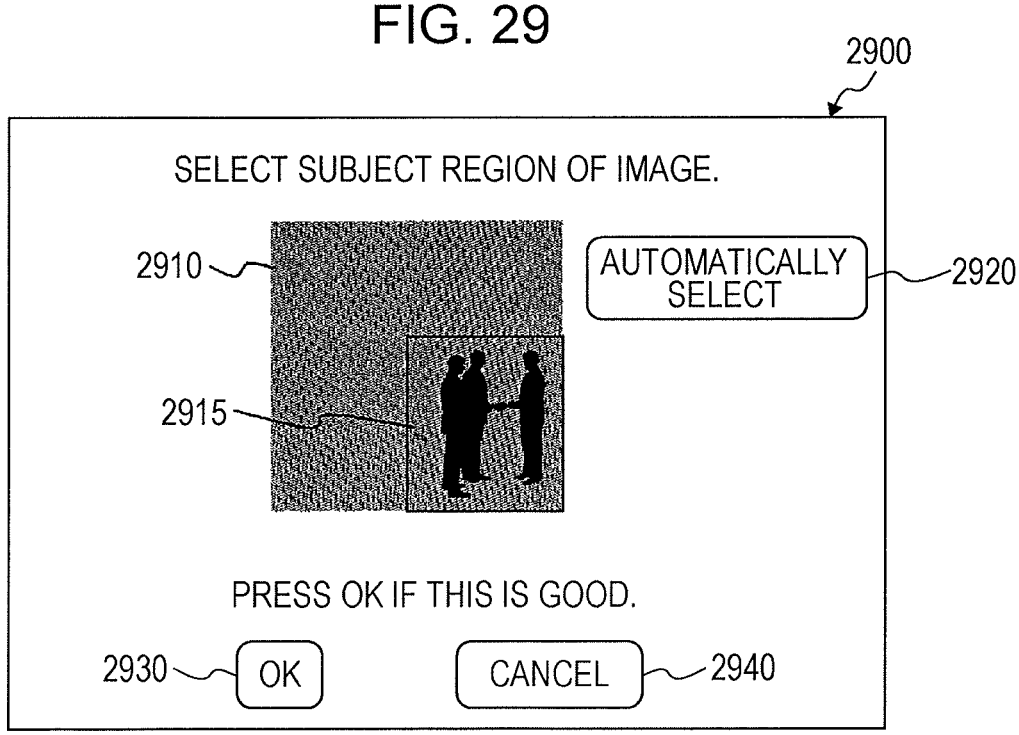
FIG. 29 is an explanatory illustration showing a display example of a background-image subject-region selection screen.

FIG. 29 is an explanatory illustration showing a display example of a background-image subject-region selection screen 2900 according to the template field table 2300. The background-image subject-region selection screen 2900 is a screen for selecting a subject region in the uploaded image. The background-image subject-region selection screen 2900 includes a background image 2910, an automatically select button 2920, an OK button 2930, and a cancel button 2940. The background image 2910 includes a subject region 2915.

The uploaded background image 2910 is displayed, and a subject region is selected in the background image 2910 by using a rectangle or a curved line in accordance with an operation by a user. Hence, the selected part (the subject region 2915) is indicated with a red frame or the like. If the subject part is clearly separated from the background as this example, the subject part may be automatically extracted by selecting the automatically select button 2920.

Figure 30:
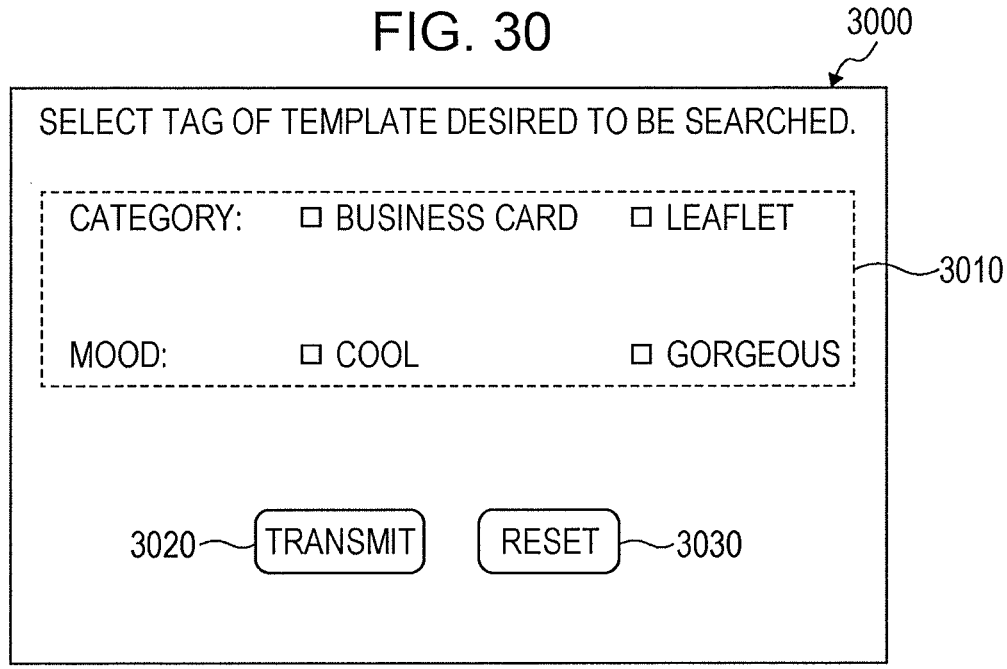
FIG. 30 is an explanatory illustration showing a display example of a tag designation screen.

FIG. 30 is an explanatory illustration showing a display example of a tag designation screen 3000 according to the template field table 2300. In the tag designation screen 3000, a tag selection region 3010, a transmit button 3020, and a reset button 3030 are displayed. The tag designation screen 3000 is a screen for causing a user to check a checkbox of a category, mood, etc., of a template desired to be searched, and transmitting the checked category, mood, etc.

Figure 31:
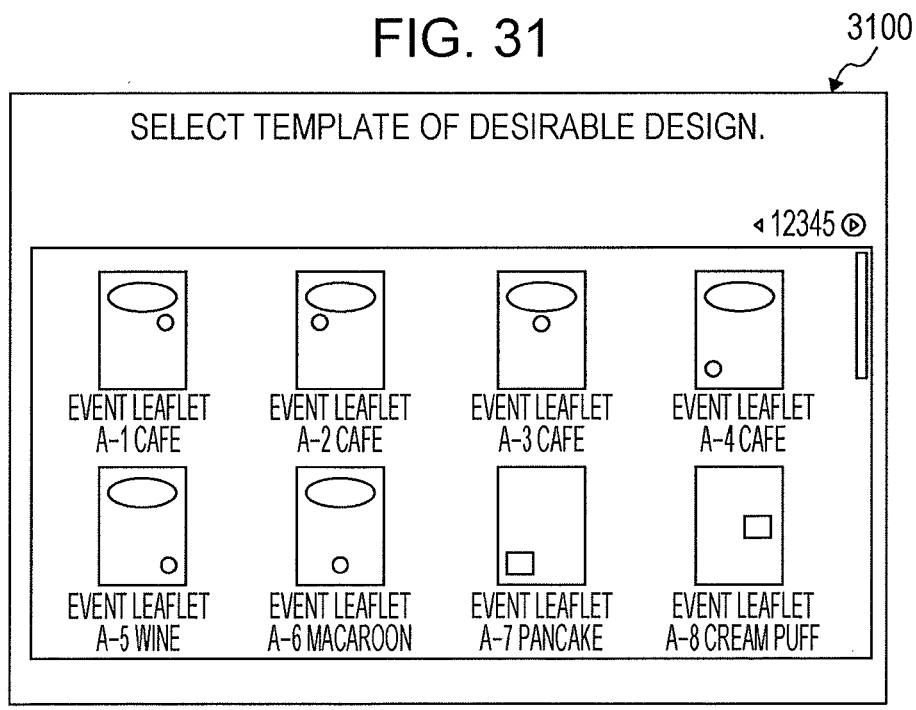
FIG. 31 is an explanatory illustration showing a display example of a template selection screen.

FIG. 31 is an explanatory illustration showing a display example of a template selection screen 3100 according to the template field table 2300. Provided is a screen displaying a list of templates from which an improper template (with overlap of a subject region and a fixed region, etc.) is excluded for the image whose subject region is selected. The user no longer selects an improper template as long as the user selects a desirable template from the template selection screen 3100.

A hardware configuration of a computer that executes a program according to this exemplary embodiment is a typical computer as exemplarily shown in FIG. 32, and specifically a computer or the like that may serve as a personal computer or a server. That is, for specific example, a computer uses a CPU 3201 as a processing unit (an arithmetic operation unit), and a RAM 3202, a ROM 3203, and an HD 3204 as memories. The HD 3204 may use, for example, a hard disk, or a solid state drive (SSD). The computer includes the CPU 3201 that executes programs of the background-image determining module 110, the subject region extracting module 120, the field region extracting module 130, the variable region extracting module 140, the overlap excluding module 150, the template presenting module 160, etc.; the RAM 3202 that stores the programs and data; the ROM 3203 that stores programs and so forth for activating this computer; the HD 3204 that is an auxiliary memory (possibly, flash memory); a receiving device 3206 that receives data on the basis of an operation by a user with respect to a keyboard, a mouse, a touch panel, or the like; an output device 3205 such as a cathode-ray tube (CRT), a liquid crystal display, or the like; and a communication line interface 3207, such as a network interface card, for connection with a communication network; and a bus 3208 that connects the aforementioned units for exchange of data. Multiple such computers may be connected through a network.

In the above-described exemplary embodiment, configurations provided by computer programs are implemented as the exemplary embodiment by causing a system with the hardware configuration to read the computer programs being software and by causing the software and the hardware resource to cooperate to each other.

The hardware configuration shown in FIG. 32 is a mere configuration example. The configuration of this exemplary embodiment is not limited to the configuration shown in FIG. 32, and may be any configuration as long as the modules described in this exemplary embodiment may be executed. For example, a part of the modules may be formed of dedicated hardware (for example, application specific integrated circuit, ASIC, or the like), a part of the modules may be arranged in an external system and may be connected through a communication line, and further the system shown in FIG. 32 may be multiple systems mutually connected through a communication line and the multiple systems may operate in an associated manner. Alternatively, in particular, a part of the modules may be arranged in any of a home information appliance, a copier, a fax machine, a scanner, a printer, and a multiple-function device (an image processing device having at least two functions of a scanner, a printer, a copier, and a fax), in addition to a personal computer.

The described program may be stored in a recording medium and provided. Alternatively, the program may be provided by a communication measure. In this case, for example, the above-described program may be interpreted as an aspect of the invention of "a computer-readable recording medium storing a program."

"The computer-readable recording medium storing the program" represents a computer-readable recording medium storing a program, the medium which is used for, for example, installation and execution of the program, and distribution of the program.

For example, the recording medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a Blu-ray (registered trademark) Disc; a magneto-optical disk (MO); a flexible disk (FD); a magnetic tape; a hard disk; a read only memory (ROM); electrically erasable programmable ROM (EEPROM, registered trademark); a flash memory; a random access memory (RAM); a secure digital (SD) memory card; and the like.

The above-described program or a part of the program may be recorded in the recording medium, and may be stored and distributed. Also, the above-described program or a part of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be a part of other program, and may be recorded in a recording medium together with other program. Alternatively, the program may be divided and recorded in plural recording media. Also, the program may be recorded in any form, for example, a compressed form or an encrypted form, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a first region extracting unit that extracts a first region from a background image, the first region which should not be hidden in the background image;
a second region extracting unit that extracts a second region from a form to be composed with the background image, a position of the second region being fixed in the form; and
a controller that, when a form is selected and when a background image and a form are composed, if the composite meets a condition relating to overlap of the first region in the background image and the second region in the form, provides control so that a form including the second region is not allowed to be selected.

2. The information processing device according to claim 1,
wherein the form includes the second region and a third region where a character is allowed to be input in the form, and
wherein, when a plurality of forms are displayed and a form is selected from the displayed forms and when a background image and a form are composed, if the composite meets a condition relating to overlap of the first region in the background image and the third region in the form, the controller provides control so that a form including the third region is displayed with a lower priority than priorities of the other forms.

3. The information processing device according to claim 1,
wherein the form includes the second region and a third region where a character is allowed to be input in the form, and
wherein, if a content of the third region is determined, the controller processes the third region as the second region.

4. The information processing device according to claim 1, wherein, if the second region is transparent, the controller provides control so that a form including the second region is allowed to be selected.

5. A non-transitory computer readable medium storing a program causing a computer to execute a process for image processing, the process comprising:
extracting a first region from a background image, the first region which should not be hidden in the background image;
extracting a second region from a form to be composed with the background image, a position of the second region being fixed in the form; and
when a form is selected and when a background image and a form are composed, if the composite meets a condition relating to overlap of the first region in the background image and the second region in the form, providing control so that a form including the second region is not allowed to be selected.

6. An image processing method comprising:
extracting a first region from a background image, the first region which should not be hidden in the background image;
extracting a second region from a form to be composed with the background image, a position of the second region being fixed in the form; and
when a form is selected and when a background image and a form are composed, if the composite meets a condition relating to overlap of the first region in the background image and the second region in the form, providing control so that a form including the second region is not allowed to be selected.

* * * * *